3,767,790
Patented Oct. 23, 1973

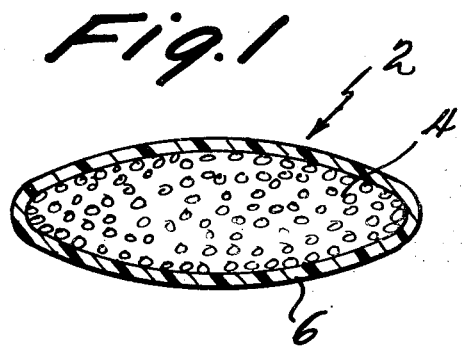
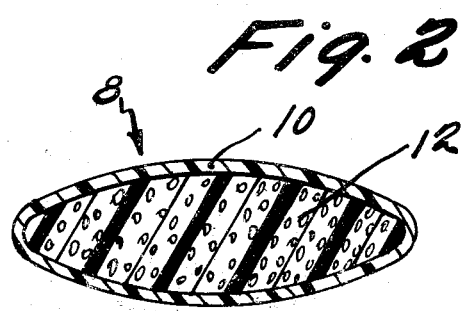
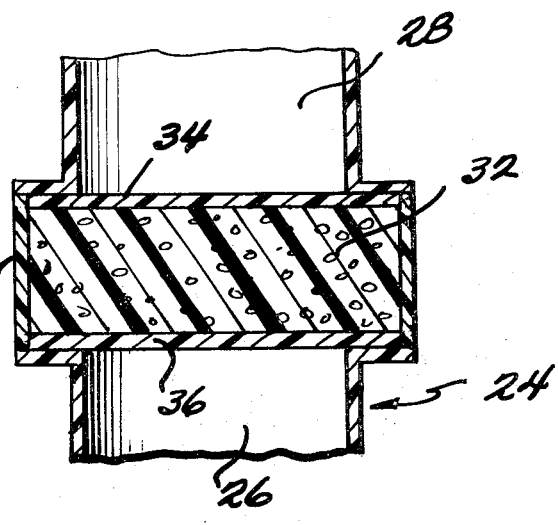
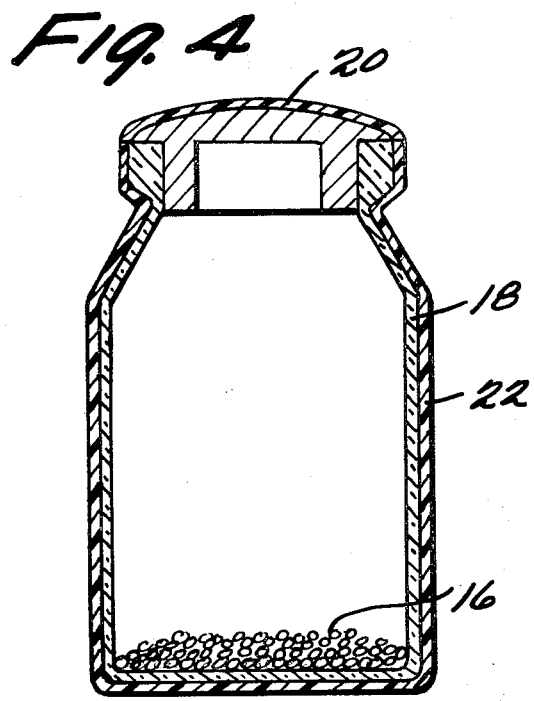
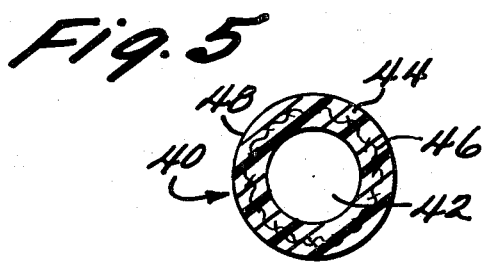

3,767,790
MICROORGANISMS
Alvin Guttag, Bethesda, Md., assignor to National Patent Development Corporation, New York, N.Y.
Continuation-in-part of abandoned application Ser. No. 832,938, June 13, 1969. This application Feb. 11, 1972, Ser. No. 225,488
Int. Cl. A61k 23/00; C12k 1/10
U.S. Cl. 424—81                                     25 Claims

ABSTRACT OF THE DISCLOSURE

Microorganisms are entrapped in a hydrophilic acrylate or methacrylate to provide controlled release or quick release or to provide a regulated time of contact with an environment on which the microorganisms can act.

---

This application is a continuation-in-part of Ser. No. 832,938 filed June 13, 1969, now abandoned.

The present invention relates to the quick or controlled release of living microorganisms such as bacteria, molds, yeast and viruses or to providing limited contact between the microorganism and an environment on which it acts.

There are occasions when it is desirable to store living microorganisms so that they can be released or can act in an appropriate area and/or at an appropriate time. Thus, it may be desirable to protect bacteria or viruses until they can be implanted in the intestines or it may be desirable to keep the microorganism dry or out of contact with air until use. It also is desirable on occasion to initiate the growth of one microorganism and later supplant the microorganism with a different microorganism, e.g. in cheese making. Additionally it is frequently desirable to control the time of action of bacteria on a substrate.

It has not been found that such purposes can be accomplished by entrapping the microorganism in a hydrophilic acrylate or methacrylate ester either in the form of a powder, tablet, pill or capsule. The entrapped products are useful not only for therapeutic purposes but also for industrial purposes, e.g. in the manufacture of bread, cheese, citric acid, penicillin, oxytetracycline, streptomycin, erythromycin, bacitracin, gramicidin, tetracycline, tyrocidin, viomycin, kanamycin, aureomycin, beer, vinegar, alcohol, buttermilk, oxamycin, dihydrostreptomycin, benzyl penicillin, neomycin, lactic acid, butyric acid, gluconic acid, fumaric acid, butanediol, glycerol, propionic acid, propanediol, sulfite liquor, grape juice, sugar cane juice, sugar beet juice.

In Shepherd application Ser. No. 550,453, filed May 16, 1966, and now abandoned, and commonly assigned there is described a petri dish containing nutrients for bacteria in which the dish is made of a hydrophilic hydrogel in accordance with Wichterle U.S. Patents Nos. 2,976,576 and 3,220,960. The nutrients in solution in a solvent are absorbed within the hydrogel which is then dried and can be stored. No bacteria are in the dish at this stage. When it is desired to provide a nutrient solution, e.g. for growth of bacteria, the dish is removed from storage, solvent added in order to leach the solid nutrient out of the polymer and to recreate the nutrient solution.

The Shepherd disclosure is distinguished from because Shepherd does not entrap or coat bacteria or other living microorganisms in the hydrophilic polymer. Instead Shepherd entraps nutrient materials which are then leached out of the polymer.

When a water soluble or organic solvent soluble hydrophilic polymer is employed the microorganism can be set free by dissolving the polymer in water or organic solvent. The microorganisms are too large to be leached from the polymer by water or organic solvent.

In another aspect of this invention microorganisms are provided in the forms of reusable systems and systems which can be employed for controlled time periods displaying durable microbial activity of increased stability. It has been found that such devices can be prepared by immobilizing active microorganisms, e.g. bacteria and yeast in a hydrophilic polymeric matrix by chemical methods or physical entrapment. Such immobilized microorganism systems can be prepared by a variety of methods which include:

(1) First dissolving or suspending the microorganisms prior to polymerization in the monomeric mixture including a cross-linking agent and then proceeding with the polymerization, resulting in a cross-linked insoluble polymeric gel lattice. The macromolecular structure of such a lattice can be controlled by varying the nature and the concentration of the monomeric moieties so that the microorganism will be retained in the gel matrix whereas molecules of substrate and reaction product, of smaller size will be able to move freely in the polymeric network.

(2) First mixing the microorganisms with an aqueous or organic solution of the polymer, and then cross-linking the polymeric mixture to render the entrapping matrix insoluble.

(3) First absorbing a suspension of the microorganisms in a porous structure such as natural and synthetic foams, porous organic and inorganic materials (e.g. foamed polymethane), e.g. (toluene diisocyanate-polytetramethylene glycol), foamed urea-formaldehyde, foamed phenol-formaldehyde, foamed polystyrene, foamed polyethylene, foamed polypropylene, foamed natural rubber, foamed butadiene-styrene copolymer, foamed epoxy resin (bisphenol A-epichlorhydrin), activated carbon, porous glass, porous metal, activated alumina, silica gel, foamed or sponge hydroxyethyl methacrylate polymers and then removing the solvent under reduced pressure.

All the devices described above can then be given an additional coating of hydrophilic polymer. This external membrane is useful in prolonging the shelf-life of the microorganisms.

The thickness of this external membrane can be designed to determine the rate of diffusion of the substrate to the vicinity of the microorganism as well as the rate of diffusion of the products out of the reaction site. The thickness can be 5 microns to 1 mm., preferably not over 500 microns, most preferably 10–50 microns. The chemical composition of this external membrane, and its macromolecular structure in the swollen state in contact with the substrate medium, will only allow dissolved molecules below a certain range of molecular weights to diffuse through it, i.e. molecules of lower molecular weight than the microorganisms, e.g. usually up to a molecular weight of 10,000, but if desired, the hydrophilic polymer can be designed to permit molecules up to 50,000 pass through so that proteins such as insulin, zein, gliadin and lactoglobulin for example will pass through.

The microorganism containing device if made from a water insoluble hydrophilic polymer preferably either contains a layer of entrapped enzyme having a coating of hydrophilic polymer or is in the form of a hollow tube having a strengthening fiber therein or is in the form of a cylindrical plug in an otherwise hollow cylinder.

The said microorganisms containing devices can be shaped as hard beads, coarse or fine powders, rods, tubes, multilayer membranes, films, fibers, hollow fibers, pouches, capsules. They can also be applied on the surface of solid substrates of any shape by adopted coating methods.

In the devices of the invention the microganisms remain permanently entrapped and they do not leach out nor does the device dissolve to set them free except in those cases when a water soluble or organic solvent soluble hydrophilic polymer is employed and then water or organic solvent is employed to set free the microorganism.

The said systems are sometimes prepared in the presence of water, buffer solution, or solvent systems that do not destroy the microorganisms, however, they can be subsequently totally dehydarted to provide an easier method of storage, with an appreciable increase in shelf life. Moreover, after use, the devices can be kept for further re-use over periods of months without appreciable loss of activity if they are dried at temperatures which do not kill the microorganisms.

Polymer matrixes are preferably made from a hydrophilic monomer which is a hydroxy lower alkyl acrylate or methacrylate, or hydroxy lower alkoxy lower alkyl acrylate or methacrylate, e.g., 2-hydroxyethyl acrylate, 2-hydroxyethyl methacrylate, diethylene glycol monoacrylate, diethylene glycol monomethacrylate, 2-hydroxypropyl acrylate, 2-hydroxypropyl methacrylate, 3-hydroxypropyl acrylate, 3-hydropropyl methacrylate and dipropylene glycol monomethacrylate. The preferred monomers for preparing the matrixes are hydroxyalkyl acrylates and methacrylates, most preferably, 2-hydroxyethyl methacrylate. The polymers produced from slurries of monomers are organic solvent soluble, e.g. alcohol soluble, but water insoluble. They can be prepared for example as shown in Shepherd Patent 3,618,213 e.g. Example 36a, or Chromacek Patent 3,575,946.

The hydroxyalkyl acrylate or methacrylate less preferably can also be replaced in part by vinyl pyrrolidone, acrylamide, methacrylamide, N-propyl acrylamide, N-isopropyl methacrylamide, N-methylacrylamide, N-methylmethacrylamide, N-methylol acrylamide and N-methylol methacrylamide, N-2-hydroxyethyl acrylamide, N-2-hydroxyethyl methacrylamide. However, these monomers usually form water soluble homopolymers and hence they require the presence of a cross-linking agent or copolymerization with a sufficient amount of the hydroxyalkyl acrylates and methacrylates to render the copolymers water insoluble for uses where the polymer is not to be dissolved.

Other ethylenically unsaturated monomers can be used in conjunction with the above monomers or copolymers to constitute hydrophilic polymeric matrixes suitable for the entrapment of enzymes. They include neutral monomers such as acrylonitrile, methacrylonitrile, vinyl acetate, alkyl acrylates and methacrylates, alkoxyalkyl acrylates and methacrylates.

Examples of alkyl acrylates and methacrylates include methyl acrylate, ethyl acrylate, butyl acrylate, 2-ethylhexyl acrylate, methyl methacrylate and butyl methacrylates. Examples of suitable alkoxyalkyl acrylates and methacrylates are methoxyethyl acrylate, methoxyethyl methacrylate, ethoxyethyl acrylate, ethoxyethyl methacrylate, propoxyethyl acrylate, butoxyethyl methacrylate, methoxypropyl acrylate, ethoxypropyl methacrylate. These comonomers when used in an amount preferably not higher than 50 percent (and usually between 0.5 and 20%) of the monomeric mixture contribute to improve the mechanical properties of the gel. They should not be used in an amount to impair the hydrophilic nature of the polymer. Other vinyl monomers bearing ionizable functional groups can be copolymerized with the hydroxyalkyl acrylates or methacrylates to constitute ionogenic matrixes which can be useful when a basic or acidic environment is required for the stability or the optimum activity of enzymes. They include acidic type monomers such as acrylic acid, methacrylic acid, maleic acid, fumaric acid, itaconic acid, aconitic acid, cinnamic acid, crotonic acid, tricarbyllic acid, propiolic acid, citraconic acid, vinyl sulfonic acid, p-vinylbenzenesulfonic acid, partial esters such as mono-2-hydroxyethyl itaconate, mono-2-hydroxypropyl citraconate, mono-2-hydroxyethyl maleate, mono-2-hydroxypropyl fumarate, monomethyl itaconate, monoethyl itaconate, monomethyl Cellosolve itaconate (methyl Cellosolve is the monoethyl ether of diethylene glycol), monomethyl Cellosolve maleate, mono-2-hydroxyethyl aconitate.

They also include basic type monomers such as aminoethyl methacrylate, dimethyl aminoethyl methacrylate, monomethylaminoethyl methacrylate, t-butylaminoethyl methacrylate, p-aminostyrene, o-aminostyrene, 2-amino-4-vinyltoluene, diethylaminoethyl acrylate, dimethylaminoethyl acrylate, t-butylaminoethyl acrylate, piperidinoethyl acrylate, piperidinoethyl methacrylate, morpholinoethyl acrylate, morpholinoethyl methacrylate, 2-vinyl pyridine, 3-vinyl pyridine, 4-vinyl pyridine, 2-ethyl-5-vinyl pyridine, dimethylaminopropyl acrylate, dimethylamino propyl methacrylate, dipropylaminoethyl acrylate, dimethylaminoethyl vinyl ether, dimethylaminoethyl vinyl sulfide, diethylaminoethyl vinyl ether, aminoethyl vinyl ether, 2-pyrrolidinoethyl methacrylate, 3-(dimethylaminoethyl)-hydroxypropyl acrylate, 3-(dimethylaminoethyl)-2-hydroxypropyl methacrylate, 2-aminoethyl acrylate, 2-aminoethyl methacrylate. The alkylaminoethyl acrylates and methacrylates are preferred in this group. These ionogenic monomers should not be used in sufficient amounts to render the hydroxyalkyl acrylates or methacrylates water soluble unless a water soluble polymer is desired. In particular cases, the most suitable matrix for the entrapment of the bacteria may be composed of multipolymers prepared from a mixture of 3, 4 or more of the above monomers. These monomers are usually used in an amount of 0.1 to 20%, preferably 1 to 15% of the total monomers.

In making a matrix suitable for bacteria entrapment it is often necessary to render said matrix insoluble in water or organic solvents. This is done by sparingly cross-linking the entrapping polymer. Preferably, the cross-linking agent is added in an amount of 1 to 10%, most preferably not over 2.0% or 2.5%, although from 0.05 to 15% or even 20% of cross-linking agents can be used. Cross-linking renders the otherwise organic solvent soluble or water soluble polymers insoluble, although it does not impair the hydrophilic properties. It is obvious that a non cross-linked organic solvent soluble polymeric system may be used when the substrate or the non-aqueous liquid used to dilute the substrate, do not constitute a solvent for the entrapping matrix when it is desired to retain the microorganisms in the polymer matrix.

Typical examples of cross-linking agents include ethylene glycol diacrylate, ethylene glycol dimethacrylate, 1,4-butylene dimethacrylate, diethylene glycol dimethacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl malate, divinyl tartrate, triallyl melamine, N,N'-methylene bisacrylamide, diallyl maleate, divinyl ether, diallyl monoethylene glycol citrate, ethylene glycol vinyl citrate, allyl vinyl maleate, diallyl itaconate, ethylene glycol diester of itaconic acid, divinyl sulfone, hexahydro-1,3,5-triacryltriazine, triallyl phosphite, diallyl ether of benzene phosphonic acid, polyester of maleic anhydride with triethylene glycol, diallyl aconitate, divinyl citraconate, diallyl fumarate, ammonium dichromate. Of course cross-linking agents and monomers which form polymers toxic to the specific microorganisms should not be employed.

In order to make polymers which are not only hydrophilic but also water soluble, e.g. for use to entrap yeast for bread manufacture, there can be employed copolymers of the hydroxyethyl or hydroxypropyl acrylate with 0.5 to 20% of an ammonium or alkali metal salt of an ethylenically unsaturated carboxylic acid or the strong acid salt of an ethylenically unsaturated amine. Thus, there can be used ammonium, potassium and sodium salts of acrylic acid, methacrylic acid, maleic acid, mono-2-hydroxyethyl itaconic and mono-2-hydroxypropyl maleate as well as hydrochloric, hydrobromic, sulfuric, nitric and phosphoric acid salts of dimethylaminoethyl methacrylate, t-butylaminoethyl methacrylate, p-aminostyrene, dimethylaminoethyl acrylate and triethanolamine monomethacrylate or there can be used similar amounts of vinyl pyrrolidone, acrylamide, methacrylamide or the like.

Polymerization can be carried out by various procedures. Thus the polymer can be formed as a casting syrup and then cured. Alternatively, the hydrophilic polymers are prepared by solution polymerization or by suspension polymerization of the hydrophilic monomer, including the cross-linking agent (if employed) and stopping the polymerization when the polymer formed will precipitate in water (if a water solubilizing monomer is not included) but is still soluble in highly polar organic solvents such as alcohols, glycols, and glycol ethers. Examples of suitable solvents are ethyl alcohol, methyl alcohol, isopropyl alcohol, ethylene glycol, propylene glycol, diethylene glycol, dipropylene glycol, monomethyl ether of ethylene glycol, dimethyl formamide, dimethyl sulfoxide and tetrahydrofurane. Polymerization to form solvent soluble polymers can be carried out for example as in Shepherd Patent 3,618,213 or Chromacek Patent 3,575,946.

Suspension polymerization is carried out in a non-polar medium such as silicone oil, mineral oil, xylene, toluene, e.g. as in Examples 36a, 36b and 36c of said Shepherd patent.

The soluble polymer formed by solution or suspension process is then dissolved in the appropriate solvent as indicated above and can be admixed with the microorganism. The solvent selected of course should not be toxic to the organism. The solvent is then removed and, if necessary, a process leading to a cross-linked structure carried out at temperatures preferably below 40° C. resulting in thin insoluble films entrapping the active enzyme. Temperatures of −5° C., or 0° C. up to 10° C. are frequently employed to insure that there is not a premature growth of the microorganism. Temperatures of 20° C., 25° C. and 37° C. can be used (or even higher with thermophilic organisms).

When the microorganism containing device is formed by direct entrapment in a cross-linked matrix, a useful method of preparing the polymer microorganism matrix consists in polymerizing a casting solution containing monomer or monomers, cross-linking agent if employed, and catalyst, in which microorganisms have been suspended in presence of variable amounts of distilled water, aqueous buffer solutions or organic solvents. Proper pH, i.e. the preferred pH for activity of the specific microorganism, enhances the subsequent growth of the microorganism. The amount of water, aqueous buffer or organic solvent can vary from 0 to 100% of the weight of the monomers and can even be more, e.g. 1000% or 1500% of such weight. The resulting casting solution is allowed to polymerize in molds of predetermined shapes so that the immobilized microorganism matrix appears as films, rods, or tubes. Such polymerizations are generally carried out at temperatures below 40° C. as previously indicated. If anhydrous conditions are not used nutrients should preferably be avoided in the polymerization medium or the product dried.

Typical organic solvents include alcohols such as methyl alcohol, ethyl alcohol, propyl alcohol, isopropyl alcohol monomethyl ether of diethylene glycol, monoethyl ether of diethylene glycol, monoethyl ether of ethylene glycol, monoethyl ether of ethylene glycol, dioxane, dioxane-water mixture, alcohol-water mixture (e.g. 95% alcohol), pyridine, dimethyl formamide, dimethyl sulfoxide, tetrahydrofurfuryl alcohol, ethylene glycol, propylene glycol, formamide, cyclohexanol, glycerol, toluene, xylene, benzene, triethylene glycol, t-butanol.

Rods or films can also be ground into coarse or fine powders suitable for filling columns, cartridges, or permeable bags. A final surface coating with polymer solution or polymerizable monomer may then be added when necessary to insure that no microorganism moiety is directly exposed to the substrate. The solvent is either removed by evaporation or otherwise until a solid coating, e.g. a gel is formed or the monomerized to form a solid coating.

Strengthening materials such as woven glass fibers, Dacron (polyethylene terephthalate) nylon (e.g. nylon 6, nylon 6,6, nylon 6,10), polyacrylonitrile fibers, vinyl chloride polymer fibers, and the like, woven gold, platinum, stainless steel thread and the like, in various mil and mesh sizes, can be present in the mold prior to polymerizing so that the strengthening material is completely encased in the casting solution. The resulting microorganisms-containing, membranes, rods and tubes are then able to sustain higher tension pressure and rough handling.

Another typical system for entrapping microorganisms can be prepared as hard microporous beads of various sizes, which can be used in a column through which the substrate flows, or in a vessel mixed with the substrate and easily recoverable after the reaction.

Such bead-like devices composed of a cross-linked hydrophilic matrix entrapping microorganism (a single type of microorganism as well as a mixture of various microorganisms for use in some reactions) can be prepared when a suspension polymerization is carried out on non polar media such as silicone oil, mineral oil, parafin oil, oxylene, benzene, toluene or in presence of a high molecular weight poly-isobutylene. The microorganisms are suspended in the monomeric phase in presence of either a small amount of water (with or without buffer) or an organic solvent, the catalyst system, the cross-linking agent (0.05 to 20% usually 1–2.5% of monomer weight). The polymerization is carried out under constant stirring rate and controlled temperature (−5 to +40° C. for example, usually 0 to 25° C.). At the end of the polymerization time, porous, hard, spherical beads in which the microorganisms are entrapped, are collected, and if desired, rapidly washed in an appropriate solvent, and then, if desired, leached in water to remove residual monomer, residual catalyst, and unbound microorganisms. Beads of various size can be obtained by varying the ratio of the monomeric phase to the suspending phase, under adequate stirring. A coating of the hydrophilic polymer can then be applied to the beads in any desired fashion.

As catalysts for carrying out the polymerization, there is usually employed a free radical catalyst in the range of 0.05 to 1% of the polymerizable monomer. The preferred amount of catalyst is 0.1 to 0.5 percent of the monomer.

Polymerization can be carried out at 20 to 150° C., usually at 40 to 90° C. for the preparation of the matrix used for solution entrapment of microorganisms, or preferably at −5 to 40° C., usually at 0 to 25° C., when the microorganisms are present in the polymerizable mixture. The lower temperatures are employed when microorganisms are present to avoid either permature growth or killing of the microorganisms.

Typical catalysts used for the polymerization of the matrix include t-butyl-peroctoate, benzoyl peroxide, isopropyl percarbonate, methyl ethyl ketone peroxide, cumene hydroperoxide, 1,3-bis-(t-butylperoxyisopropyl) benzene and dicumyl peroxide. Another group of catalysts useful mainly for low temperature polymerization includes redox systems such as potassium persulfate-riboflavine, potassium persulfate-sodium bisulfite, hydrogen peroxide-divalent iron. Various compounds such as N,N,N',N'-tetramethylethylenediamine can be used to accelerate the effect of the catalysts. Irradiation, e.g., by ultraviolet light of gamma rays can also be employed to catalyze the polymerization. The catalyst is not critical and any of those conventional in the art can be employed.

The polymer formed in the suspension polymerization or obtained from the casting syrup, if desired, can be dissolved in water or the appropriate solvent as indicated above providing the solvent is not toxic to the microorganism and can be admixed with any suitable substrate containing the microorganisms, e.g. agar, the solvent removed and, if necessary, the polymerization completed. Alternatively, the solvent containing polymer solution can be coated on microorganisms entrapped in solvent insoluble hydrophilic polymer and the solvent removed to form a film or coating for the entrapped material.

When the casting syrup is employed, polymerization can be carried out until a solid is formed with or without the microorganism entrapped therein. If the cast material is to be employed as a coating for the microorganisms rather than merely being in admixture therewith, the central portion of the casting is hollow and an entrance to the hollow portion is provided, either by the shape of the initial casting or simply by cutting a hole therein, the microorganisms inserted, and the aperture closed with more partially cured polymer followed by completion of the cure.

The casting syrup can be cured to form products which exist in a solid state, e.g. rigid state, and can be swollen. The cross-linked polymer obtained from the cured liquids has reversible fluid absorption properties, the ability to retain its shape in a fluid absorption media and to elastically recover its shape after deformation. The water soluble polymers will simply dissolve in water to expose the microorganisms and render them available. When insoluble polymers are employed the microorganisms are retained in the polymer matrix and the liquid system on which the microorganisms are to act must be absorbed by the matrix.

Polymeric powders prepared by any of the methods set forth above as well as by disintegrating a polymer produced in the form of a foam are mixed with the desired microorganisms with the aid of an appropriate solvent if necessary, and the mixture placed on a mechanical roller so that the materials can be intimately mixed. The mixture is dried by air evaporation or gentle heat or by freeze drying. Upon evaporation of the solvent, e.g. water, the microorganism substance is retained by the powder. The powder can be formed into pills, tablets or capsules if desired. Due to its extreme hydrophilicity and because the hydrophilic polymer of this invention has reversible fluid adsorption properties, the powders can be reconstituted in a biological system so that the microorganism can be reached by the biological fluid which passes through the polymer matrix at a steady rate (except in the case of the water soluble polymers in which event the entrapping polymer is simply dissolved).

As microorganisms, for example, there can be used *Streptococcus lactis, Saccharomyces cerevisiae, Lactobaccillus delbrueckii, Aspergillus niger, Acetobacter rances, Bacterium curvum, Lactobacillus bulgaricus, Lactobacillus casei, Lactobacillus leichmannii, Citromyces pfefferianus, Penicillin arenarium, Rhizopus nigricans, Penicillin notatum, Streptomyces griseus, Streptomyces citrovorus, Penicillin roqueforti, Lactobacillus cucumerus,* Influenza virus e.g. type A, strain PR–8), *Lactobacillus bifidus, Lactobacillus acidophilus, Escherichia coli, Saccharomyces cerevisiae, Saccharomyces anamensis, Rhizopus nigricans, Aspergillus oryzae, Saccharomyces ellipsoideus, Saccharomyces pastorianus, Clostridium butyricum, Streptococcus lactis, Propionibacterium freudenreichii, Streptomyces rimosus forma paromycinus, Actinomyces griseus, Streptomyces kanamyceticus, Streptomyces humidus,* adenovirus type 3 (Camp Lejeune 15520 strain), adenovirus type 7, attenuated poliomyelitis virus Type I (SM strain) or Type II (TN strain) or Type III (Fox strain) (see Patent No. 2,946,724), poliomyelitis virus of the MEI–1 strain of the Lansing type attenuated by at least 119 serial passages in suckling hamsters (see Patent No. 3,125,489), live attenuated poliomyelitis virus of Sabin's Type I, II or III, infectious bovine rhinotracheitis virus (I.B.R. virus) attenuated as set forth in Patent No. 3,048,524, I.B.R. virus (Ithaca strain) attenuated by 50 passages in lamb renal cells, attenuated live measles virus (Edmonston strain) attenuated as set forth in Patent No. 3,133,861—Example 2, attenuated B.C.G. (bovine tubercle Bacillus), attenuated live rabies virus (Flury strain) further cultured in chick embryo tissue culture as set forth in Patent No. 3,255,080, attenuated chick embryo modified canine distemper virus, avirulent living duck-embryo modified infectious canine hepatitis virus (see Patent No. 3,153,474), attenuated avian pneumoencaphalitis virus (see Patent No. 3,155,-588), avirulent *Bacillus anthracis* strains ATCC 14185, ATCC 14186 and ATCC 14187, attenuated hog cholera virus (porcine origin or rabbit origin) or tissue culture origin (see Patent No. 3,226,296), attenuated virus diarrhea virus (Oregon C24V strain) attenuated as set forth in Patent No. 3,293,129, attenuated panleukemia virus (see Patent No. 3,293,130), attenuated *Salmonella dublin* (strain ATCC 15480), attenuated *Salmonella gallinarum,* noninfectious rinderpest virus (see Patent No. 2,756,176), rumen microorganisms, Newcastle virus (9251 strain) attenuated by 125 passages in embryonated chicken eggs, see strain of influenza inactivated as set forth in Patent No. 3,058,894, mixed canine distemper virus, rabies virus and infectious hepatitis virus or the like.

The combination of the hydrophilic polymer and entrapped microorganism if used as a medicine can be taken orally or implanted parenterally, enterally, or subcutaneously or can be shot into the body (in either veterinary medicine or human therapy) in capsule form with a bolus gun or other conventional technique.

The novel formulation of this invention comprises a dosage unit combination capable of releasing the microorganisms in the case of the water soluble polymer, immediately. The rate of release for the most part will be determined by the ratio of the hydrophilic polymer to the material containing the microorganism, by the sequence or thickness of the coatings which are employed, or by the presence of one or more blocking layers. Blocking layers used in the invention may be any of those ingestible materials conventionally employed including waxes such as beeswax, carnauba wax, Japan wax, paraffin, bayberry wax, higher fatty acids, such as oleic acid, palmitic acid and stearic acid, esters of such higher fatty acids such as glyceryl tristearate, cetyl palmitate, diglycol stearate, glyceryl myristate, triethylene glycol monostearate, higher fatty alcohols such as cetyl alcohol and stearyl alcohol, and high molecular weight polyethylene glycols such as the Carbowaxes, polyethylene glycol mono-stearate, polyethylene glycol distearate, polyoxyethylene stearate, glyceryl monostearates and mixtures thereof.

The blocking layer or the coating layer can be 0.1 to 5 mils thick to retard the availability of the inner microorganisms. The thickness can be chosen for any desired time delay.

Unless indicated, all parts and percentages are by weight.

The invention can be employed for example in preparing ethyl alcohol from aqueous solutions of sucrose, maltose, fructose, invert sugar or raffinose (e.g. a 15% sucrose solution) using a hydroxyethylmethacrylate polymer (HEMA polymer) containing entrapped *Saccharomyces cerevisiae;* or from glucose or fructose (e.g. as a 10% aqueous solution) with HEMA polymer containing entrapped *Saccharomyces ellipsoideus.* Acetic acid can be prepared from aqueous ethyl alcohol (e.g. 10% alcohol) using entrapped *Bacterium curvum* or *B. orleanese* or *Acetobacter rancens.* Lactic acid can be prepared from aqueous lactose, maltose, glucose, sucrose or dextrins or molasses (e.g. 10% lactose) using entrapped *Lactobacillus delbrueckii, L. bulgaricus* or *L. casei.* Butyric acid can be prepared from aqueous sucrose or molasses (e.g. 10% aqueous molasses) using entrapped *Clostridium butyricum*. Citric acid can also be prepared from sucrose or molasses (e.g. 12% aqueous sucrose) using entrapped *Citromyces pfefferianus.* Gluconic acid can be prepared from glucose (e.g. 10% aqueous glucose) using entrapped *Aspergillus niger.* Fumaric acid can be prepared from glucose using entrapped *Rhizopus nigricans.* Antibiotics can also be prepared using conventional organisms, e.g. penicillin using entrapped *Penicillium notatum;* streptomycin using *Streptomyces griseus,* aureomycin using *Streptomyces aureofaciens* and chloromycetin using *Streptomyces venezuelae.* The conventional auxiliary nutrients can also be added to either the liquid passed through the entrapped microorganism or, if the auxiliary agents are water insoluble, they can be included with the entrapped microorganisms.

When a water insoluble hydrophilic polymer is employed as the entrapping agent in making the products set forth above, it is preferably a polymer of HEMA, usually containing about 0.2 to 0.3% ethylene glycol dimethacrylate as a cross-linking agent. The time of contact of the liquid passing through the entrapped microorganism is usually 12–24 hours but the time can be shorter e.g. 4 hours, or longer, e.g. 36, 48 or 96 hours.

If the hydrophilic polymer containing entrapped microorganisms are in the form of beads or other small particles, they can be conveniently retained in a tube between two screens so that the nutrient containing liquid, e.g. aqueous sucrose, can pass through the screens but the beads be retained in order to limit the time of action. The preferred method of controlling the time of contact, however, is that shown in FIG. 3 of the drawings.

The invention will be understood best in connection with the drawings wherein:

FIG. 1 is a cross sectional view of a tablet, pill or capsule or pellet according to the invention.

FIG. 2 is a cross sectional view of another form of tablet or pill;

FIG. 3 is a cross sectional view of a tube having entrapped microorganisms according to the invention;

FIG. 4 is a cross sectional view illustrating a device for storing a product of the invention; and FIG. 5 is a cross sectional view of another embodiment of the invention.

Referring more specifically to FIG. 1 of the invention there is provided a capsule (pill or tablet) 2 in capsule form comprising microorganisms 4 in dry form (e.g. yeast, *Lactobacillus bifidus, Penicillin roqueforti,* attenuated I.B.R. virus, etc.) as a core with a coat 6 of the hydrophilic polymer previously described, e.g. 2-hydroxyethyl methacrylate-ethylene glycol dimethacrylate (100:0.2). When taken orally or implanted in a biological system, the hydrophilic coating allows body fluids or industrial fluid, e.g. aqueous sucrose to penetrate at a predetermined rate and contact the microorganisms for a predetermined period of time. The coating can have a thickness, for example, of 1.0 mil. If the coating is of a water soluble polymer, it will dissolve to set free the microorganisms.

As shown in FIG. 2 a capsule (pill or tablet) 8 has a core comprising microorganisms 10 entrapped on the hydrophilic hydroxyethyl methacrylate polymer 12 having an enteric coating 14, e.g. of cellulose acetate, shellac, methyl cellulose, polyethylene glycol 6000, etc.

On occasion it is important to store the microorganisms, e.g. under anaerobic conditions. This can be done according to the invention as shown in FIG. 4 by placing the microorganisms entrapped in the hydrophilic polymer (e.g. 2-hydroxyethyl methacrylate-ethylene glycol dimethacrylate copolymer (100:0.4)) as particles 16 in glass bottle 18 having a conventional rubber stopper 20 having an overall coat 22 of Saran (e.g. vinylidene chloride-acrylonitrile copolymer (80:20)). The bottle can either be evacuated or filled with a dry nitrogen, argon or helium atmosphere prior to sealing. Bottles of this type are shown in French Pat. No. 1,266,294. If desired, the bottle can also have a conventional aluminum securing ring around the rubber stopper. Alternatively, glass containers with ground glass stoppers can be used to maintain a nitrogen atmosphere or the granules (or capsules or pills) can simply be wrapped in metal foil impervious to the atmosphere.

The container 18 can also be used to provide a holder for reaction. Thus if the microorganisms entrapped are *Aspergillus niger*, there can be added an aqueous solution (e.g. 15%) of glucose (at a pH of 3.5 to produce gluconic acid or a pH of 2.0 to produce citric acid). The solution is then allowed to remain in contact with the beads for 48 hours at room temperature, drained off and the particles dried and stored for subsequent use. The gluconic acid (or citric acid) formed is then recovered from the aqueous liquid in conventional fashion from the drained-off product.

As shown in FIG. 3 there is provided a cylindrical tube 24 of any inert material, e.g. nickel or polyethylene, having hollow sections 26 and 28 joined by an intermediate section 30. The intermediate section 30 comprises an inner cast copolymer of hydroxyethyl methacrylate-ethylene glycol dimethacrylate (100:0.3) 32 having entrapped therein any suitable microorganism, e.g. *Aspergillus niger* or yeast or *Penicillium notatum.* Completely encasing the cast polymer are top and bottom membranes 34 and 36 of hydroxyethyl methacrylate-ethylene glycol dimethacrylate (100:3). The membranes are permeable to aqueous solutions and are impermeable to microorganisms. An appropriate aqueous solution, e.g. a 10% glucose solution at pH 3.5 is passed through tube 24 from section 26 through membrane containing section 30 and then to section 28. Gluconic acid is formed during the passage through section 30, e.g. during a period of 4 hours and the gluconic acid containing solution is withdrawn from tube section 28 and recovered. The time it takes the solution to pass through section 30 of the tube can be regulated to any desired time simply by varying the thickness of the membranes 34 and 36 and the thickness of the cast layer 32. If desired either or both of membranes 34 and 36 can be omitted but their use is preferred to insure stability of the entrapped microorganisms in storage.

In place of a tube such as that shown in FIG. 3, there can be employed a tube 40 as disclosed in FIG. 5 composed of a hydrophilic hydroxyethylmethacrylate polymer wall 44, preferably having a reinforcing sheathing, e.g. of Dacron mesh 46. The tube has entrapped therein the microorganism. An aqueous solution, e.g. 10% sucrose, is passed through the lumen 47 of the tube with the result that the solution diffuses into the microorganism entrapped tube. If the microorganism is *Aspergillus niger* and the aqueous sucrose solution has a pH of 2.0, there is diffused out of the outer surface 48 of the external portion of the tube an aqueous solution of citric acid which can be collected in any desired manner. To preserve the shelf life of the bacteria (or other microorganism) the tube 40 can have inner and outer coatings of a hydrophilic water insoluble HEMA polymer. To control the rate at which an aqueous solution in the lumen of the tube can reach the microorganism, there can be used an inner coating of a hydrophilic water insoluble HEMA polymer.

The following examples will further illustrate the invention.

EXAMPLE 1

2-hydroxyethyl methacrylate is stirred with 0.15 gram per 100 grams of methacrylate of isopropyl percarbonate in an anaerobic atmosphere at ambient temperature. Ethylene glycol dimethacrylate in the concentration of 0.1 gram per 100 grams of 2-hydroxyethyl methacrylate is added. Then a lyophilized mixture (prepared by lyophilizing 30 grams of moist *Lactobacillus acidophilus*

(containing 5 grams of bacteria and 75 grams of water), 10 grams of skim milk powder, 5 grams lactose and 0.5 gram xylose) containing *L. acidophilus* was added in an amount of 10 grams per 100 grams of methacrylate to provide a casting syrup.

The casting syrup was polymerized to a solid by heating to 40° C. and adding 0.3 gram of further isopropyl percabonate. This product was useful as such or as a core for a capsule having an outer enteric coating of cellulose acetate hydrogen phthalate, methyl cellulose or the like. There can be employed in place of the *L. acidophilus*, *E. coli*, *Saccharomyces cerevisiae*, *Acetobacter rances*, attenuated, I.B.R. virus, attenuated hog cholera virus or any of the other microorganisms mentioned supra.

EXAMPLE 2

Distilled 2-hydroxy ethyl methacrylate (100 g.) is stirred with 0.1 g. tertiary butyl peroctoate in an anaerobic atmosphere at 25–70° C. for 15–40 minutes. The resultant mixture is cooled to 25° C. and tertiary butyl peroctoate added so as to make the total concentration of tertiary butyl peroctoate in the system 0.2/100 grams of 2-hydroxy ethyl methacrylate. Ethylene glycol dimethacrylate, in a concentration of 0.2 g./100 g. of 2-hydroxy ethyl methacrylate is added at the same time as the catalyst concentration is brought up to the theoretical content.

100 g. of the resulting syrup was added to three times its volume of water with vigorous agitation. The white precipitate so obtained was isolated by filtration and dried to yield 9.0 g. of polymer showing an intrinsic viscosity of 1.03 when dissolved in absolute methanol.

Discs of hydrophilic polymer, prepared as shaped articles from this solution, measuring ¼ inch in diameter and 0.05 mm. in thickness, were saturated with nonpathogenic Fox strain poliomyelitis harvested in aqueous medium. The entrapped virus was then dried.

EXAMPLE 3

Into a flask equipped with an agitator and a heating mantle was charged 1000 grams of silicone oil, 100 grams of 2-hydroxy ethyl methacrylate and 0.33 gram of isopropyl percarbonate. The flask was placed under a nitrogen atmosphere and the contents were rapidly agitated and heated to 100° C. After 15 minutes at 100° C., the polymer slurry obtained was filtered hot to isolate the polymer. The polymer powder was reslurried in 300 ml. of xylene, filtered and dried.

In a separate container, 9.9 g. of 2-hydroxyethyl methacrylate is mixed with 0.0214 gram of ethylene glycol dimethacrylate and 0.05 gram of benzoyl peroxide.

3.6 g. of the powder, when mixed with 9.9 g. of the formulated hydroxyethyl methacrylate mixture formed a paste mixture. The mixture was cast and cured to form a hollow cylinder 50 mm. long, with an outside diameter of 5 mm. and walls 0.5 mm. thick. The hollow interior of the cylinder was filled with rumen organisms and the hole sealed with further casting polymer.

Examples 4–7 illustrate other polymers suitable for use according to the invention.

EXAMPLE 4

A solution was made of 100 parts of 2-hydroxyethyl acrylate, 0.2 part of ethylene glycol dimethacrylate and 0.4 part of t-butyl peroctoate and then cast into a mold and polymerized.

EXAMPLE 5

A solution was made of 100 parts of an isomeric mixture of hydroxyisopropyl methacrylates, 0.2 part propylene glycol dimethacrylate and 0.4 part of t-butyl peroctoate and then cast into a mold and polymerized.

EXAMPLE 6

100 parts of 2-hydroxyethyl methacrylate was stirred with 0.05 part of t-butyl peroctoate in a nitrogen atmosphere at a temperature of 40° C. for 30 minutes. The resultant mixture was cooled to 25° C. and t-butyl peroctoate added so as to make the amount of t-butyl peroctoate added in the system 0.15 part. 0.1 part of ethylene glycol dimethacrylate was also added along with the second addition of the t-butyl peroctoate and cast.

EXAMPLE 7

The process of Example 6 was repeated, substituting 0.2 part of 1,3-butylene glycol dimethacrylate in place of the ethylene glycol dimethacrylate as the cross-linking monomer.

EXAMPLE 8

100 parts of 2-hydroxyethyl methacrylate was stirred with 50 parts of distilled water and 0.1 part of t-butyl peroctoate in an anaerobic atmosphere at a temperature of 40° C. for 20 minutes. The water was removed, alcohol added as a solvent and the resultant mixture was cooled to 25° C. and 0.05 part of t-butyl peroctoate added and at the same time there was added 0.2 part of ethylene glycol dimethacrylate as a cross-linking monomer. The product was then polymerized to form a solution. There was aded *L. casei* and the mixture freeze dried.

EXAMPLE 9

2-hydroxy ethyl methacrylate (100 g.) is mixed with tertiary butyl peroctoate in the quantity 0.15 g./100 g. methacrylate. Ethylene glycol dimethacrylate, in the concentration of 0.20 g./100 g. 2-hydroxy ethyl methacrylate is added along with 1 gram of a foaming agent, sodium bicarbonate. The mixture is heated to 70° C. and the resulting solid, friable polymeric foam is ground into fine powder of 80 mesh. The polymeric powder so formed is mixed with attenuated poliomyelitis virus (Type I (SM strain)) in aqueous fluid medium flavor solution and the resultant mixture is placed on a mechanical roller for approximately 2 hours. The polymeric powder thus absorbs the virus. The solution is then filtered and the residue freeze dried to form an entrapped virus in the hydrophilic polymer.

EXAMPLE 10

The process of the previous Example 9 is followed, substituting *Saccharomyces cerevisiae* for the polio virus.

EXAMPLE 11

2-hydroxy ethyl methacrylate (100 g.) is mixed with tertiary butyl peroctoate (0.20 g.). Ethylene glycol dimethacrylate (0.20 g.) is added along with 4 g. of a foaming agent, sodium bicarbonate. The mixture is heated to 70° C. and the resulting solid, friable polymeric foam is ground into fine powder of 80 mesh. The polymeric powder formed is mixed with 4% of aqueous polio virus Type I Sabin having an $ID_{50}$ of $10^{7.835}$ and the resultant mixture placed on a mechanical roller until the polymeric powder has absorbed the desired concentration of virus. The solution is then filtered and the residue dried at 20° C. in vacuo.

EXAMPLE 12

The procedure of Example 11 was repeated using attenuated I.B.R. virus (passed 50 times in lamb renal cells) and freeze drying rather than drying at 20° C.

Similarly attenuated measles virus can be used to replace the I.B.R. virus as can B.C.G. vaccine.

EXAMPLE 13

40 lbs. of hydroxyethyl methacrylate, 4 lbs. of methacrylic acid, 120 lbs. of methanol and 0.05 lb. of t-butyl peroctoate were heated to 80° C. and stirred for 6 hours to effect polymerization. To the polymer solution was added slowly a 10-fold excess of acetone to precipitate the polymer. After drying 36 lbs. of water soluble copolymer was obtained.

The polymer was dissolved in water to provide a 10 weight percent solution. To the solution was added 1% of aqueous *Saccharomyces cerevisiae*. The mixture was then cast as a 20- mil film on a polyethylene sheet and dried. The resulting brittle film was ground to —60 mesh to yield a dry powder which dissolved and released the yeast upon contact with water or milk.

In place of the *S. cerevisiae* there were also used *L. casei*, starter culture and I.B.R. virus to provide entrapped microorganisms, which were released on contact with aqueous liquid.

EXAMPLE 14

150 grams of distilled hydroxyethyl methacrylate, 600 grams of methanol and 0.3 gram of t-butyl peroctoate (catalyst) are polymerized in a three-neck flask equipped with a stirrer and a reflux condenser, under a blanket of nitrogen, at 67° C. The resulting hydroxyethyl methacrylate polymer is then purified by slow precipitation in a tenfold excess of distilled water. The precipitated polymer is then washed thoroughly with distilled water, and dried overnight at room temperature under reduced pressure. (85% yield.)

EXAMPLE 15

A solution of 10 grams of the dry polymer of Example 14 in 85 grams of ethylene glycol monomethyl ether was prepared and cooled to 5° C. A solution of 0.2 gram ammonium dichromate in 5 ml. distilled water was then added and the solution was mixed during 5 minutes with a magnetic stirrer to produce a cross-linkable hydroxyethyl methacrylate polymer solution.

EXAMPLE 16

A dispersion of 0.1 gram of yeast (*S. cerevisiae*) in 0.5 gram distilled water was prepared, and mixed with 4.5 grams of the polymer solution prepared in Example 15.

On a horizontal casting table lined with poleythylene, a 8 mils thick layer of polymer-yeast mixture was cast with a Gardner Casting Blade. A flow of cold dry nitrogen was directed toward the surface of the film during 5 minutes. The film was then irradiated during 10 more minutes with a General Electric U.V. Sunlamp (275 watts) placed 5 inches above the surface to cross-link the polymer. A 0.5-mil thick transparent film was obtained. On top of this film still positioned on the casting table, a 2-mil thick layer of the solution of polyhydroxyethyl methacrylate as prepared in Example 2, was cast with the casting blade and immediately irradiated during 5 minutes with the U.V. Sunlamp. An insoluble bilayer membrane 0.6-mil thick, with immobilized yeast therein, was obtained. The membrane consisted of the relatively thick film of cross-linked hydroxyethyl methacrylate polymer containing entrapped urease and a relatively thin (0.1 mil) layer of cross-linked hydroxyethyl methacrylate polymer free of the yeast. The yeast containing layer generally is at least twice as thick as the yeast free coating layer. The yeast containing layer for example can be from 0.25 mil to 10 mils or even more, e.g. 250 mils or higher.

A sample of yeast-containing film was introduced into a tube as shown in FIG. 3 and served as the intermediate section 30. A solution containing 5000 grams of sucrose in a liter of water was passed through the tube, entering the film on the yeast free side and emerging on the yeast containing side to form ethyl alcohol. The reaction was carried out at 25° C.

EXAMPLE 17

In a flask, equipped with a magnetic stirrer, was prepared a solution containing 50 parts of hydroxyethyl methacrylate and 2 parts of N,N-methylenebisacrylamide. To this solution was added a dispersion of *Rhizopus oryzae* in 5 parts of water, and the contents of the flask were thoroughly mixed and deaerated by bubbling nitrogen during 15 minutes. A solution of 0.25 part of ammonium persulfate in 5 parts of water was then added to the mixture, followed after one minute by a solution of 0.25 part of sodium bisulfite in 5 parts of water. The contents of the flask were immediately poured in a mold formed by 2 glass plates separated by a 5 mm. thick rubber gasket, positioned in a water bath at 10° C. The polymerization started immediately. After 4 hours, the mold was opened and a strong foam-like polymeric gel entrapped *R. oryzae* was obtained. The thick gel slab was cut in irregular particles 2–3 mm. large. The particles were thoroughly washed with distilled water, and dried at 23° C. under reduced pressure. They were then placed between two screen in a pipe and a sugar solution containing 200 grams of sucrose per liter passed through the pipe. A large part of the sucrose in the solution, passed through the polymer particles, was converted to lactic acid. The particles of gel could also be coated with a 0.5-mil thick layer of hydroxyethyl methacrylate polymer to enhance the shelf life of the entrapped *R. oryzae* containing particles.

EXAMPLE 18

The process of Example 17 was repeated, substituting *Aspergillus niger* for the *R. oryzae* and pouring the microorganism containing polymerizable mixture in glass tubes 0.8 cm. in diameter. Rods of *A. niger* entrapping gel were obtained. The rods were sliced into discs (25 mm. thick). The discs were coated on the top and bottom with a copolymer of hydroxyethyl methacrylate ethylene dimethacrylate (99.8:0.2). Each coating film was 1 mm. thick. A 10% aqueous sucrose solution having a pH of 2.0 was passed through a tube as shown in FIG. 3 having the coated disc as the intermediate section. The aqueous solution emerging from the tube contained citric acid resulting from the fermentation of the sucrose.

EXAMPLE 19

10 g. hydroxyethyl methacrylate, 8 g. acrylamide, 5 g. methacrylic acid, 2 g. ethylene glycol dimethacrylate were mixed with 20 g. of distilled water pH 7.0. A dispersion of *Streptomyces humidus* in 35 g. distilled water was added and the mixture was deaerated during 15 minutes. A solution of 0.12 g. ammonium persulfate in 5 ml. water was then added while stirring, followed after one minute by a solution of 0.12 g. of sodium bisulfite in 5 ml. water. The mixture was then poured immediately into a mold composed of the interval between the walls of 2 concentric glass tubes, the larger of which had an internal diameter of 4 mm. and the smaller an external diameter of 3 mm. in presence of a Dacron mesh (5 mils) sheathing. The tube which was formed by polymerizing is shown in FIG. 5. (To preserve the shelf life of the microorganism the tube 18 can have inner and outer coatings of a hydrophilic water insoluble hydroxyethyl methacrylate polymer which does not contain microorganisms. To control the rate at which a material in the lumen of the tube can reach the microorganism there can be used an inner coating of a hydrophilic water insoluble hydroxyethyl methacrylate polymer.)

In a specific example utilizing FIG. 5 an aqueous solution containing 3% corn steep liquor, 1% HCl-hydrolyzate of soybean meal, 0.1% $K_2HPO_4$, 0.05% $MgSO_4 \cdot 7H_2O$ and sufficient $Ca(OH)_2$ to give a pH of 7.0 was forced through the lumen of the tube. The solution diffused into the microorganism entrapped tube and dihydrostreptomycin diffused out of the outer surface of the external portion of the tube. The procedure was carried out at 28° C.

Streptomycin can be prepared in similar manner employing *Streptomyces griseus* as the microorganism and employing as the nutrient passed through the lumen of the tube an aqueous composition having a pH of 7 and including per liter 15 grams of 1-proline, 10 grams of glucose, 5 grams of NaCl, 2 grams of $K_2HPO_4$, 1 gram of $MgSO_4 \cdot 7H_2O$, 0.4 gram of $CaCl_2$, 20 mg. of $FeSO_4 \cdot 7H_2O$ and 10 mg. of $ZnSO_4 \cdot 7H_2O$.

What is claimed is:

1. A dosage consisting essentially of living therapeutic microorganisms entrapped or coated with a hydrophilic lower alkyl acrylate or methacrylate polymer or a hydrophilic hydroxy lower alkoxy lower alkyl acrylate or methacrylate polymer in dry form.

2. A dosage according to claim 1 wherein the hydrophilic polymer is water soluble and is a polymer of hydroxyethyl acrylate, hydroxypropyl acrylate, hydroxyethyl methacrylate or hydroxypropyl methacrylate.

3. A dosage according to claim 2 wherein the microorganism is entrapped in the polymer.

4. A dosage according to claim 1 wherein the hydrophilic polymer is water insoluble and the therapeutic microorganisms are not elutable therefrom.

5. A dosage according to claim 4 wherein the polymer is a polymer of hydroxyethyl acrylate, hydroxyethyl methacrylate, hydroxypropyl acrylate or hydroxypropyl methacrylate.

6. A dosage according to claim 2 wherein there is an enteric coating on the hydrophilic polymer entrapped therapeutic microorganism and the hydrophilic polymer is water soluble.

7. A dosage according to claim 2 wherein the therapeutic microorganism is a yeast.

8. A dosage according to claim 2 wherein the therapeutic microorganism is a bacteria.

9. A dosage according to claim 2 wherein the therapeutic microorganism is a virus.

10. A dosage according to claim 1 in the form of a dry powder.

11. A dosage according to claim 1 in which the dry microorganisms are present in a core surrounded by a coat of said polymer, said polymer being water insoluble.

12. A dry product comprising a solid water insoluble hydrophilic polymer of a member of the group consisting of hydroxy lower alkyl acrylates, hydroxy lower alkyl methacrylates, hydroxy lower alkoxy lower alkyl acrylates and hydroxy lower alkoxy lower alkyl methacrylates, having entrapped therein a living therapeutic or industrial microorganism.

13. A product according to claim 12 wherein the polymer is a sparingly cross-linked polymer.

14. A product according to claim 12 wherein the polymer is a polymer of hydroxyethyl acrylate, hydroxyethyl methacrylate, hydroxypropyl acrylate or hydroxypropyl methacrylate.

15. A composition comprising a relatively thick layer of the product of claim 12 having on at least one surface thereof a relatively thin membrane layer of a microorganism free water insoluble hydrophilic polymer of a member of the group consisting of hydroxy lower alkyl acrylates, hydroxy lower alkyl methacrylates, hydroxy lower alkoxy lower alkyl acrylates, hydroxy lower alkoxy lower alkyl methacrylates, vinyl pyrrolidone, acrylamide, methacrylamide, N-lower alkyl acrylamide, N-lower alkyl methacrylamide, N-hydroxy lower alkyl acrylamide and N-hydroxy lower alkyl methacrylamide.

16. A composition according to claim 15 wherein the thick layer and the thin layer are both made of polymer of hydroxyethyl acrylate, hydroxyethyl methacrylate, hydroxypropyl acrylate or hydroxypropyl methacrylate.

17. A composition according to claim 16 wherein the thin membrane is from 5 to 500 microns.

18. A composition according to claim 17 wherein the thin membrane is 10–50 microns and the thick layer is at least twice as thick as said thin membrane.

19. A composition according to claim 15 wherein the relatively thin membrane layer is coated on one side only of said relatively thick layer.

20. A composition according to claim 15 wherein the relatively thin layer completely encases said relatively thick layer.

21. A product according to claim 12 in the form of a hollow tube.

22. A product according to claim 21 having reinforcing fibers embedded therein.

23. A tube according to claim 21 having a relatively thin overall internal membrane coating of a microorganism free water insoluble, hydrophilic polymer of a member of the group consisting of hydroxy lower alkyl acrylates, hydroxy lower alkyl methacrylates, hydroxy lower alkoxy lower alkyl acrylates, hydroxy lower alkoxy lower alkyl methacrylates, vinyl pyrrolidone, acrylamide, methacrylamide, N-lower alkyl acrylamide, N-lower alkyl methacrylamide, N-hydroxy lower alkyl acrylamide and N-hydroxy lower alkyl methacrylamide.

24. A product according to claim 12 wherein the hydrophilic polymer is a copolymer of said hydroxy alkyl acrylate or methacrylate or hydroxy alkoxyalkyl acrylate or methacrylate with up to 50% of a copolymerizable ethylenically unsaturated monomer based on the weight of the monomeric mixture.

25. A product according to claim 24 wherein the copolymerizable monomer is between 0.1 and 20% of said monomer mixture.

References Cited
UNITED STATES PATENTS

| | | | |
|---|---|---|---|
| 3,046,201 | 7/1962 | White et al. | 195—100 |
| 3,247,078 | 4/1966 | Herrett | 195—102 |
| 3,577,512 | 5/1971 | Shepherd et al. | 424—81 X |
| 3,220,960 | 11/1965 | Wichterle et al. | 260—2.5 |
| 2,976,576 | 3/1961 | Wichterle et al. | 18—58 |

SHEP K. ROSE, Primary Examiner

U.S. Cl. X. R.

195—100, 102; 206—84; 424—89, 92

UNITED STATES PATENT OFFICE
CERTIFICATE OF CORRECTION

Patent No. 3,767,790                          Dated  October 23, 1973

Inventor(s)  Alvin Guttag

It is certified that error appears in the above-identified patent and that said Letters Patent are hereby corrected as shown below:

In the heading to the printed specification, lines 5 and 6, cancel "Continuation-in-part of abandoned application Ser. No. 832, 938, June 13, 1969.".  Column 1, lines 19 and 20, cancel "This application is a continuation-in-part of Ser. No. 832,938 filed June 13, 1969, now abandoned."

Signed and sealed this 25th day of June 1974.

(SEAL)
Attest:

EDWARD M.FLETCHER,JR.                C. MARSHALL DANN
Attesting Officer                    Commissioner of Patents